(12) United States Patent
Haley et al.

(10) Patent No.: US 8,131,757 B2
(45) Date of Patent: Mar. 6, 2012

(54) TAXONOMY BASED INDEXING AND SEARCHING

(75) Inventors: Michael B. Haley, San Rafael, CA (US); Laura Quiroga, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 623 days.

(21) Appl. No.: 12/239,266

(22) Filed: Sep. 26, 2008

(65) Prior Publication Data

US 2009/0089270 A1 Apr. 2, 2009

Related U.S. Application Data

(60) Provisional application No. 60/976,296, filed on Sep. 28, 2007, provisional application No. 60/976,191, filed on Sep. 28, 2007.

(51) Int. Cl.
*G06F 17/30* (2006.01)
(52) U.S. Cl. ...................................................... 707/777
(58) Field of Classification Search .................. 707/777, 707/999.003
See application file for complete search history.

(56) References Cited

U.S. PATENT DOCUMENTS

| | | | | |
|---|---|---|---|---|
| 6,446,061 B1* | 9/2002 | Doerre et al. | | 707/738 |
| 7,792,838 B2* | 9/2010 | Ranganathan et al. | | 707/739 |
| 7,865,495 B1* | 1/2011 | Roizen et al. | | 707/708 |
| 2002/0035555 A1* | 3/2002 | Wheeler et al. | | 707/1 |
| 2002/0083039 A1* | 6/2002 | Ferrari et al. | | 707/1 |
| 2003/0046114 A1* | 3/2003 | Davies et al. | | 705/3 |
| 2003/0167283 A1* | 9/2003 | Remsen et al. | | 707/104.1 |
| 2005/0216448 A1* | 9/2005 | Talib et al. | | 707/3 |
| 2006/0085750 A1* | 4/2006 | Easton et al. | | 715/708 |
| 2006/0122994 A1* | 6/2006 | Kapur et al. | | 707/4 |
| 2007/0038610 A1 | 2/2007 | Omoigui | | |
| 2007/0250487 A1* | 10/2007 | Reuther | | 707/3 |
| 2007/0299743 A1* | 12/2007 | Staib et al. | | 705/27 |
| 2008/0027929 A1* | 1/2008 | Rice et al. | | 707/6 |

OTHER PUBLICATIONS

International Search Report mailed Dec. 2, 2008, International application No. PCT/US08/77906, International filing date Sep. 26, 2008.

* cited by examiner

*Primary Examiner* — Kimberly Lovel
*Assistant Examiner* — Mohammed R Uddin
(74) *Attorney, Agent, or Firm* — Gates & Cooper LLP (57) ABSTRACT

A method, apparatus, and computer program product provide the ability to locate and display data in a taxonomy. A canonical taxonomy is defined (that is not exposed to a user that is searching for parts) by defining canonical categories and canonical attributes in a hierarchical structure. Mapping taxonomies are defined that define mapping categories that map to both canonical categories and canonical categories plus canonical attributes. Part data is processed based on the mapping taxonomies during which the data is mapped to a canonical category. A search request is specified in a particular mapping taxonomy format and results are returned (and displayed) that include data from multiple different taxonomies.

24 Claims, 9 Drawing Sheets

TAXONOMY BASED INDEXING AND SEARCHING

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/976,296, filed Sep. 28, 2007, by Michael B. Haley and Laura Quiroga, entitled "TAXONOMY BASED INDEXING AND SEARCHING,"; and Provisional Application Ser. No. 60/976,191, filed Sep. 28, 2007, by Michael B. Haley and Laura Quiroga, entitled "SCALABLE PORTAL ARCHITECTURE FOR SEARCH AND CONTENT WAREHOUSING,".

BACKGROUND OF THE INVENTION

1. Field of the Invention

The present invention relates generally to taxonomies, and in particular, to a method, apparatus, and article of manufacture for mapping and searching across multiple different taxonomies.

2. Description of the Related Art

Taxonomies are used within almost every website today to categorize and help users find data. When browsing a website, a user must learn the structure of a proprietary taxonomy or use a standard taxonomy that may not be familiar to the user. What is needed is a mechanism for searching across a variety of different taxonomies using a schema or taxonomy that the user is familiar with. The problems of the prior art may be better understood with an explanation of taxonomies and prior art search and retrieval methodologies.

As used herein, the term "taxonomy" generally refers to a scheme by which parts may be categorized. The term "category" refers to the category (e.g., a casement window) for a particular part. More specifically, a "taxonomy" is a data format for a particular supplier for a particular part for a particular industry. Different manufacturers will not always use the same data formats. The individual formats are referred to as taxonomies.

Taxonomies may be defined by multiple industries for a broad range of uses. These taxonomies include some of the following: CSI MasterFormat 2004™ taxonomy, OmniClass 1.0™ taxonomy, and CSI UniFormat II™ taxonomy.

In addition, taxonomies can be defined more narrowly. For example, a specific manufacturer may maintain an internal taxonomy to organize inventory or a catalog. As an example, a company (e.g., the assignee of the present invention, Autodesk, Inc.™) may maintain a taxonomy for each of its product catalogs. In this regard, Autodesk, Inc™ utilizes the following taxonomies: Autodesk AutoCAD-MEP Catalog Structure™, Autodesk Revit-Arch Catalog Structure™, Autodesk Revit-MEP Catalog Structure™, and Autodesk AutoCAD-Str Catalog Structure™. Each of these taxonomies has its own vocabulary and unique hierarchy. Further, taxonomies often involve a class and one or more subclasses.

Traditionally, architects have supplied floor plans or other drawings as the initial step in the design process (e.g., the home design process) and the general contractors (GC) have supplied the individual pieces that fill out the floor plan. This includes everything from windows and doors to faucets and light fixtures. Increasingly, architects are adding these specific pieces to drawing files. Unfortunately, searches to find the particular fixture involves using a standard search engine and often take far longer than it should (up to 60% of the time). Further, searches may result in a huge number of records in many different formats (e.g., taxonomies). I Accordingly, in the prior art, users have had to use traditional searches to find the information that they need (e.g., using web search engines). In this regard, to find certain parts in certain formats, users utilized standard web searches that potentially returned thousands of hits. The user would then refine the search, being more specific, and return fewer hits. Subsequently the user would select a link and search for the part. Once a part was selected, and if a corresponding file actually exists, the user would download a file for the part. If the file does not exist, the user would continue searching. With such an approach, the user may not find relevant information, and would be forced to refine the search, and start the entire process over.

Another problem with the prior art is how to effectively digest a wide range of catalog data (pertaining to specific parts) defined in a myriad of classification schemes/taxonomies. Once (and if) this data has been indexed, the further problem is how to query across it without being limited to data originating from specific classification schemes/taxonomies.

Traditional database aggregation approaches to this problem have involved a strict normalization of all incoming data into a single master schema. Such an approach is inherently a non-scalable model due to the specific attention that is required to each individually different schema and the fragility of this system in the face of a changing schema. Furthermore, the database approach suffers from the problem of requiring an exact match to a query or no results are returned.

In view of the above, what is needed is the capability to process/digest a wide range of catalog data defined in a myriad of different classification schemes and the capability to search across all of the different catalog data regardless of the schema used to conduct the search.

SUMMARY OF THE INVENTION

One or more embodiments of the invention provide for the use of a canonical taxonomy that can be visualized as the collection of all supplier part taxonomies into a standard format collected into a central database (taxonomy database). The canonical taxonomy does not have knowledge of the other taxonomies but serves as a standard format to which other supplier part taxonomies are mapped to. Further, embodiments of the invention bridge the gap between users who are familiar with a standard taxonomy and can quickly navigate to a category with users who are not familiar with a particular standard taxonomy or may not want to navigate a taxonomy structure. In order to provide this functionality to users, a user interface provides a variety of industry standard taxonomies (or non-standard taxonomies), as well as a simple search input box allowing for free form text searching across multiple taxonomies.

Accordingly, architects can easily add fixtures (external drawing files) from manufacturers, part companies, retailers (suppliers) by aggregating supplier data into a general database using a general format (a single canonical taxonomy) and users are allowed to search this database by processing a users query (which is specified in an industry taxonomy) to fit the canonical taxonomy of the database. It does not require that the suppliers have the same data format, nor does it require that a users search be formatted in a particular way. The search is processed to fit the format of all the suppliers. Thus, suppliers can use one or more industry taxonomies to uniquely identify a product category (as well as any relevant attributes that may be inherent in the taxonomy description) and a pipeline converts this specification to the general canonical format.

To provide such functionality, a user search is canonically formatted to suit the format of the taxonomy database and returns very specific data to the user.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention define a common format for specifying industry defined taxonomies as well as a mapping to a canonical taxonomy.

Hardware Environment

Figure 1:
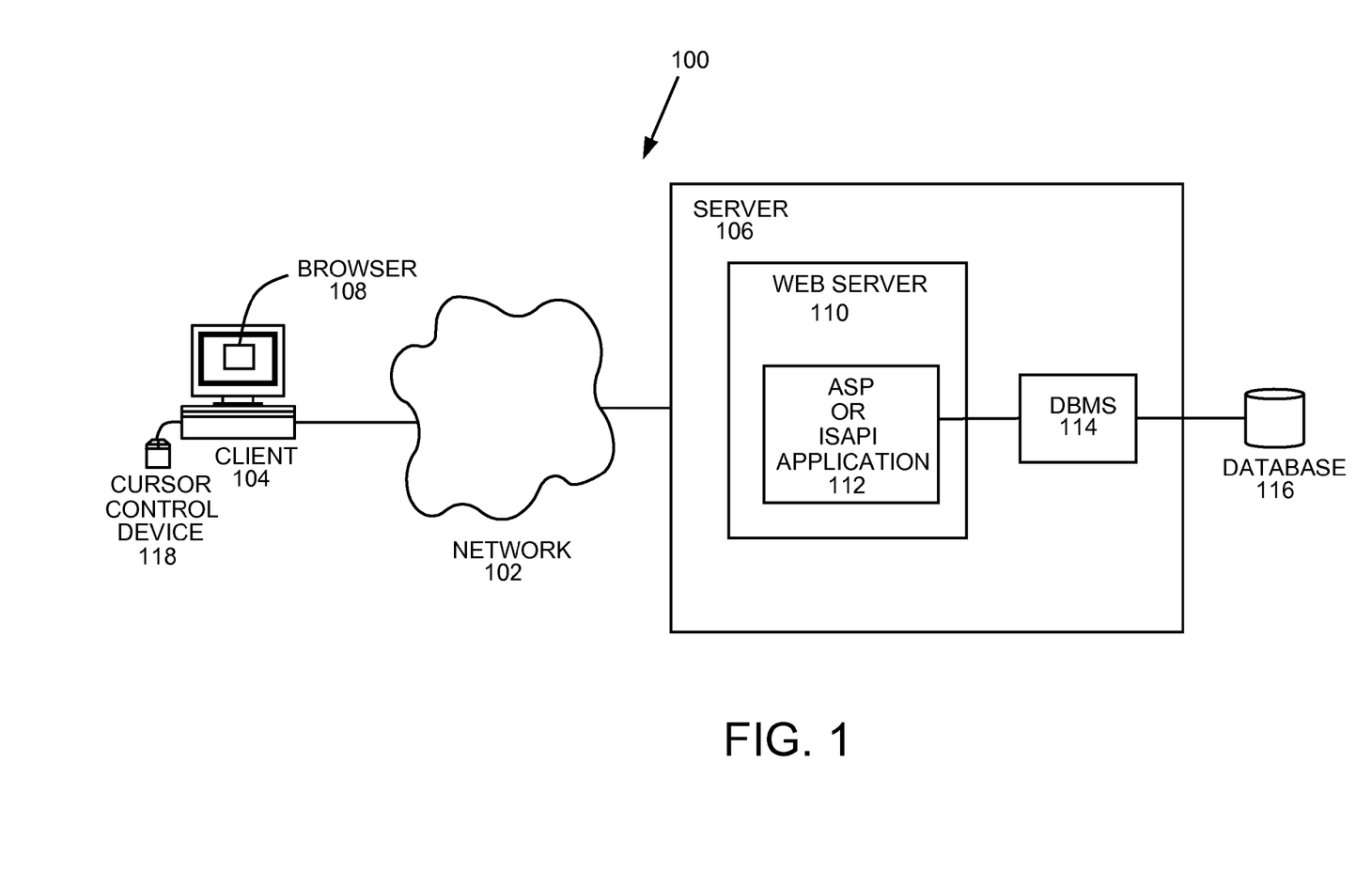
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs, WANs, SNA networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Additionally, network 102 may utilize radio frequency (RF) to connect and provide the communication between clients 104 and servers 106. Clients 104 may execute a client application or Web browser 108 and communicate with server computers 106 executing Web servers 110. Further, the software executing on clients 104 may be downloaded from server computer 106 to client computers 104 and installed as a plug in or ActiveX™ control of a Web browser. Accordingly, clients 104 may utilize ActiveX™ components/component object model (COM) or distributed COM (DCOM) components to provide a user interface on a display of client 104. The Web server 110 is typically a program such as Microsoft's Internet Information Server™.

Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system (DBMS) 114. Alternatively, database 116 may be part of or connected directly to client 104 instead of communicating/obtaining the information from database 116 across network 102. When a developer encapsulates the business functionality into objects, the system may be referred to as a component object model (COM) system. Accordingly, the scripts executing on web server 110 (and/or application 112) invoke COM objects that implement the business logic. Further, server 106 may utilize Microsoft's Transaction Server (MTS)™ to access required data stored in database 116 via an interface such as ADO (Active Data Objects), OLE DB (Object Linking and Embedding DataBase), or ODBC (Open DataBase Connectivity).

Generally, these components 108-118 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media. In other words, an "article of manufacture" or "computer program product" is a program storage device, readable by a computer that tangibly embodies at least one program of instructions executable by the computer to perform specific method steps.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Software Embodiments

One or more embodiments of the invention are implemented in an application or browser 108 executing on client 104. As used herein, the client 104 may also be viewed as the user while the server 106 may be viewed as the content provider. Such an application 108 bridges the gap between users 104 who are familiar with a standard taxonomy and can quickly navigate to a category with users 104 who are not familiar with a particular standard taxonomy or may not want to navigate a taxonomy structure. In order to provide this functionality to users 104, embodiments of the invention provide a user interface 108 with all of the industry standard taxonomies (that the invention supports), as well as a simple search input box allowing for free form text search.

Figure 2:
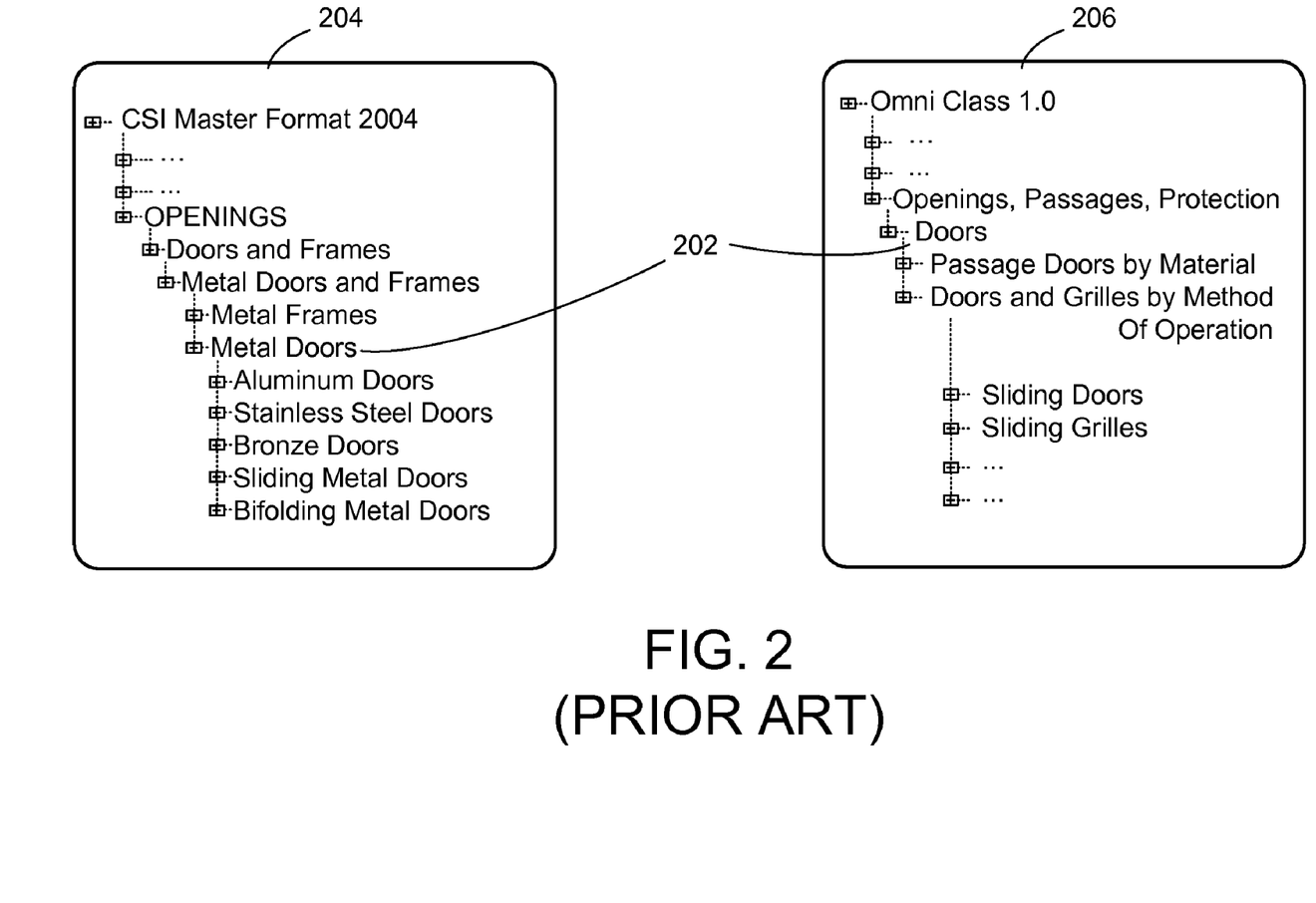
FIG. 2 illustrates the format of two prior art taxonomies.

In addition to providing multiple taxonomies for the user/client 104 to search, embodiments further provide content providers 106 the ability to classify content using a standard taxonomy. This means that the content provider 106 and the user 104 may use different taxonomies to classify and search. The challenge here comes when multiple taxonomies that contain the same logical category. For instance, as illustrated in FIG. 2, it is possible to find "Doors" 202 under both the CSI MasterFormat 2004™ taxonomy 204 and the CSI OmniClass 1.0™ taxonomy 206.

If users 104 are only allowed to search by the category used by the content provider 106, it would be incumbent upon the content provider 106 to classify all of the data for all standard taxonomies. In general, this would not be a practical requirement. Instead, embodiments of the invention allow the content provider 106 to be as flexible with the classification as the user 104 searching the site (e.g., database 114).

The remainder of the specification describes the architecture for providing the flexibility needed by content providers 106 and our users 104. The first section discusses the taxonomy architecture itself, and the subsequent sections describe how the taxonomy is used during processing, indexing, searching and in the user interface 108.

Taxonomy Architecture

Embodiments of the invention define a common format for specifying industry defined taxonomies as well as a mapping to a canonical taxonomy. As used herein and as described above, a taxonomy is a scheme by which parts may be categorized. Further, the term "category" is a category (e.g., casement window) of a particular part. Lastly, the term "attribute" is a parameter that identifies a specific aspect of a part (e.g., the "width" of a window).

Once configured, an application produced in accordance with embodiments of the invention may include multiple industry taxonomies. Each of these taxonomies may use the Web Ontology Language (OWL)™ for its definition and may further be defined in accordance with an XML schema/specification referred to herein as the TaxonomyXML specification™. OWL™ supports the ability to define object properties and relationships and has the advantage of being able to apply specific properties to specific objects. For example, a user can define a chair as being an instance of furniture and "seat" as a variation of "chair" as applied to furniture. In addition, it provides the ability to define hypernyms and hyponyms—where "wood" is a "material" and "pine" is a type of "wood". The ability to define hypernyms and hyponyms is useful in determining what material types are provided under a specific category. OWL™ allows this set to be inferred. Since "wood" is a "material" and "pine" is a "wood", "pine" must be a "material".

Each of the industry taxonomies is defined separately with its own XML representation. Such separately defined industry taxonomies are referred to as "mapping taxonomies". In addition, a unique taxonomy is defined and is referred to as the "canonical taxonomy". The canonical taxonomy represents the reference point for all other taxonomies and is the key to mapping one taxonomy category to another. However, the canonical taxonomy is never surfaced to the user. Thus, the "canonical taxonomy" may be viewed as an intermediate taxonomy that defines the mapping information for all taxonomies.

Each of the taxonomies defines a set of categories and the relationships between them. For each of the categories within the mapping taxonomies, a mapping back to the canonical taxonomy is defined. Since the canonical taxonomy is a shallow taxonomy and the industry taxonomies are deep taxonomies, it is necessary to extract the attribute information from the mapping taxonomy category as well. As used herein a shallow taxonomy reflects many different horizontal categories of a hierarchy while a deep taxonomy refers to multiple different levels of a hierarchy with each level being a further specialization or detail of a parent node in the hierarchy. For instance, the deep mapping taxonomy may contain a category called "Wood Windows". However, this category is simply a "Window", with a Material attribute equal to "Wood". Therefore, both a category and category+attribute mappings may be defined.

Figure 3:
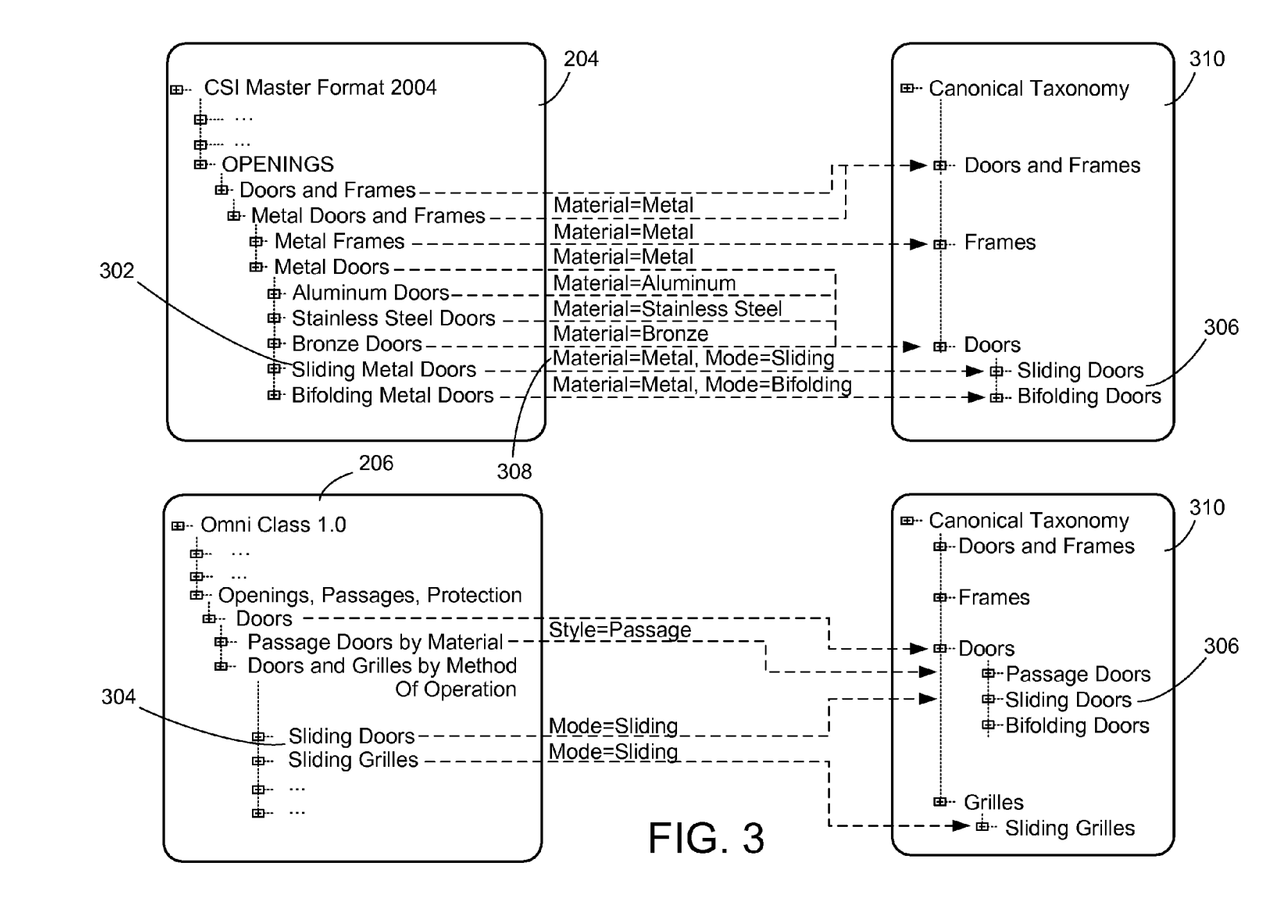
FIG. 3 illustrates a mapping from specific taxonomies to a canonical taxonomy in accordance with one or more embodiments of the invention.

FIG. 3 illustrates how the category "Sliding Metal Doors" 302 in the MasterFormat™ taxonomy and the category "Sliding Doors" 304 in the OmniClass™ taxonomy both map to the same category 306 ("Sliding Doors"). Additionally, the MasterFormat™ category 302 would have an attribute 308 defined as "Material=Metal".

The canonical taxonomy 310 represents all of the categories defined by all of the supported mapping taxonomies 204-206. In addition to defining the relationships between all of the categories within the canonical taxonomy 310, the canonical taxonomy 310 defines all of the attributes supported by each category. For instance, a category "Window" may include attributes "Height", "Depth" and "Material". These attributes are used to drive the user to relevant search terms for the categories. The attribute defined in the canonical taxonomy 310 may also include a standard unit of measure. This unit is used to normalize all of the data to a single unit for easier searching. The canonical taxonomy also supports the use of enumerations and variations. Enumerations are defined as a set of valid values for a given attribute. A given canonical taxonomy 310 is not limited to the enumeration. Further, the enumeration may define its hyponyms. Variations provide the ability to define an attribute using more than one word. For example, a variation on the attribute "length" may be "len".

Figure 4:
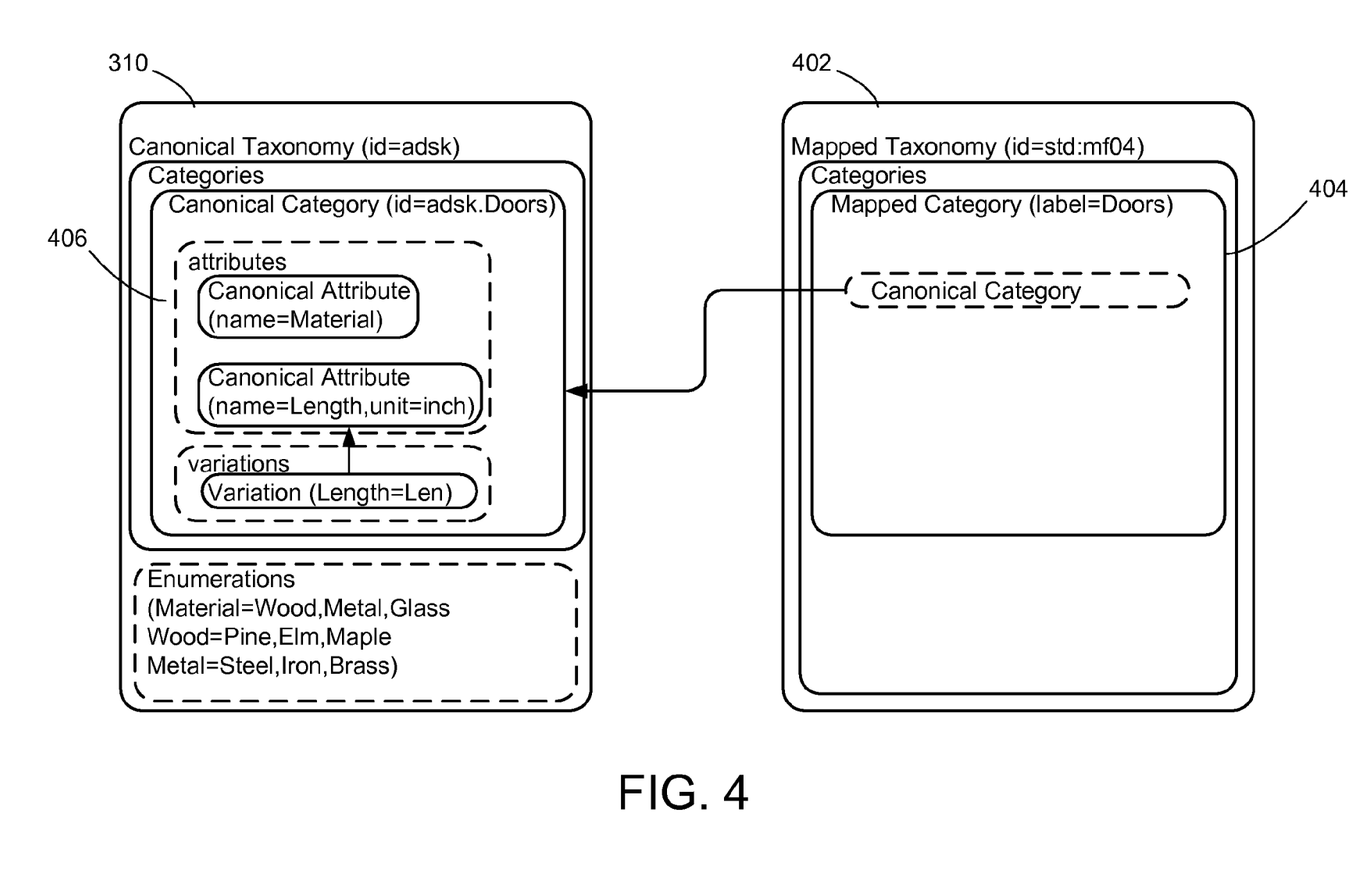
FIG. 4 represents a simple category to category mapping in accordance with one or more embodiments of the invention.
Figure 5:
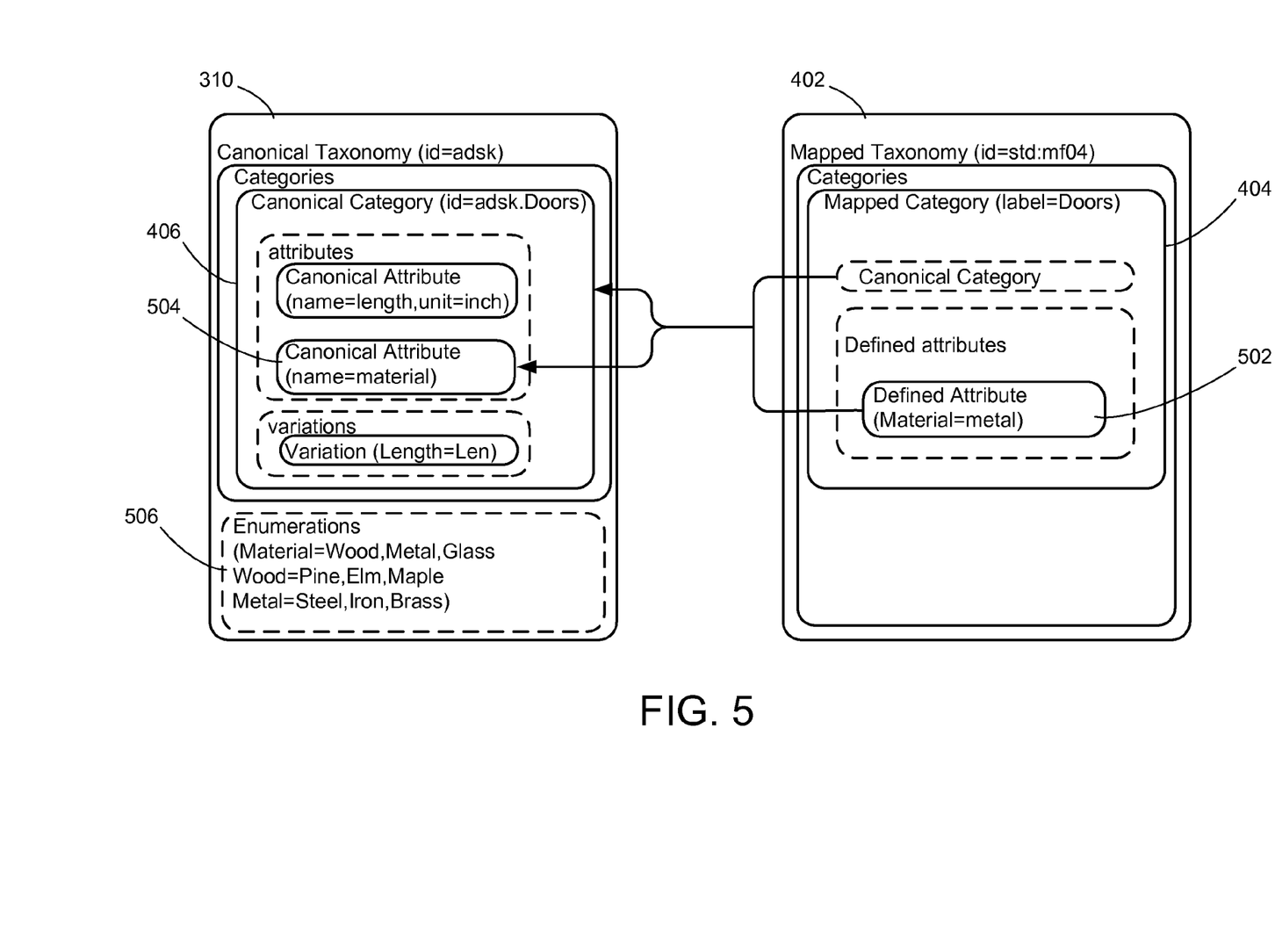
FIG. 5 illustrates a category to category plus attribute mapping in accordance with one or more embodiments of the invention.

FIGS. 4 and 5 illustrate the structure of the canonical 310 and mapping taxonomies 402 and how they relate to each other in accordance with one or more embodiments of the invention. FIG. 4 represents a simple category to category mapping. As illustrated, the doors category 404 from the mapped taxonomy 402 is mapped to the doors category 406 in the canonical taxonomy 310.

FIG. 5 illustrates a category to category plus attribute mapping. As illustrated, the doors category 404 from the mapped taxonomy 402 is mapped to the doors category 406 in the canonical taxonomy. In addition, the material=metal attribute 502 from the mapped taxonomy 402 is mapped to the material attribute 504 of the canonical category 310. Further, various enumeration's 506 are specified within the canonical taxonomy definition 310 including materials that may include metal as a defined type. The enumeration's 506 provide that (1) the material may consist of wood, metal, or glass; (2) wood may consist of pine, elm, or maple, and (3) metal may consist of steel, iron, or brass.

Not shown in FIGS. 4 and 5 is the use of ranges. Ranges are defined in the taxonomy for each attribute 502 with a unit definition. This is not strictly required, but gives the taxonomy (and a website used in accordance with the taxonomy) the ability to display ranges within an attribute filter. An index can also be used to determine the ranges, allowing the data to determine the appropriate range sets.

Thus, the canonical taxonomy 310 maintains a unique vocabulary which can be defined to encompass multiple taxonomies. In addition, the canonical taxonomy 310 can be used to define the unique semantics of the different vocabularies. This includes the ability to define enumeration's and equivalent phrases. For example, referring to FIG. 5, the enumeration 506 for wood could be defined as any of the following: Elm, Pine or Maple. This flexibility allows the canonical taxonomy 310 to be defined in a very loose way.

Further, the mapping taxonomy 402 defines the hierarchy defined by the industry taxonomy. In addition, a rich attribute set can be added to capture the category definitions. For example, referring to FIG. 3, a category called "wood sliding doors" may have two attributes added to map to a general category called "Doors" by adding the "Material=Wood" and "Mode of Operation=Sliding" attributes.

In view of the above, embodiments of the invention may implement both the mapping taxonomies 402 and canonical taxonomies 310 (as well as the mapping between them) using XML (extensible markup language). In this regard, a first XML document may be utilized to define a canonical taxonomy 310 having various elements. The canonical taxonomy 310 would define categories (e.g., windows) and sub-categories (e.g., casement windows), as well as attributes (e.g., length and material), possible ranges for the attributes (as needed), and possible enumeration's for the attributes (e.g., maple, elm, and pine for types of wood materials). This first XML document representing the canonical taxonomy 310 is likely to be maintained in private (i.e., is not publicly accessible or viewable by a user) to ensure transparency and ease of use for clients 104 accessing and searching the taxonomy.

A second XML document may be utilized to define each mapping taxonomy 402 in accordance with one or more embodiments of the invention. Since the mapped taxonomy 402 is a deep taxonomy, multiple categories 404 would be defined and mapped to the appropriate canonical category 406 in the canonical taxonomy 310 (all within the second XML document).

The resulting XML documents would define/specify a hierarchy for the mapped taxonomy 402 and canonical taxonomy 310 of categories, enumeration's, and attributes.

Thus, embodiments of the invention apply a more flexible approach (than the prior art) to classification systems and utilize a search metaphor rather than a pure database-query based system. In embodiments of the invention, a master classification system (e.g., the canonical taxonomy 310 is developed but the key difference is that other classification systems (i.e., the mapped taxonomies 402) are also supported (as mappings to this system). Further, data that is discovered that does not exactly map to its purported classification model is still considered as part of the eventual search by a client 104.

Eventually, the mapped taxonomies 402 may be normalized during processing and later used as part of an indexing process. Such normalization serves to normalize the classification of a specific part and its attributes into the canonical taxonomy 310 thereby making the parts commonly locatable.

The specific data contained within each taxonomy representation 402 may have the following properties:

(1) is comprised of a hierarchical structure permitting a single node to be linked to more than one distinct parent node that is not a descendant or ascendant of the other parents;

(2) for each category (node) the name and all synonyms (including multiple language variants) are represented;

(3) within each category node, a list of properties/attributes may be defined;

(4) each property attribute has: (the unit and value semantics below may be shared but multiple properties within multiple categories):

(a) a name and a list of synonyms;

(b) a type;

(c) a unit representation as well as information on how to convert this back to a standard unit; and    (d) a set of value semantics of non-numeric data (such as types of wood and a localized taxonomy for wood).

(5) all sub-categories inherit the properties of the parent categories unless specifically specified not to.

Figure 6:
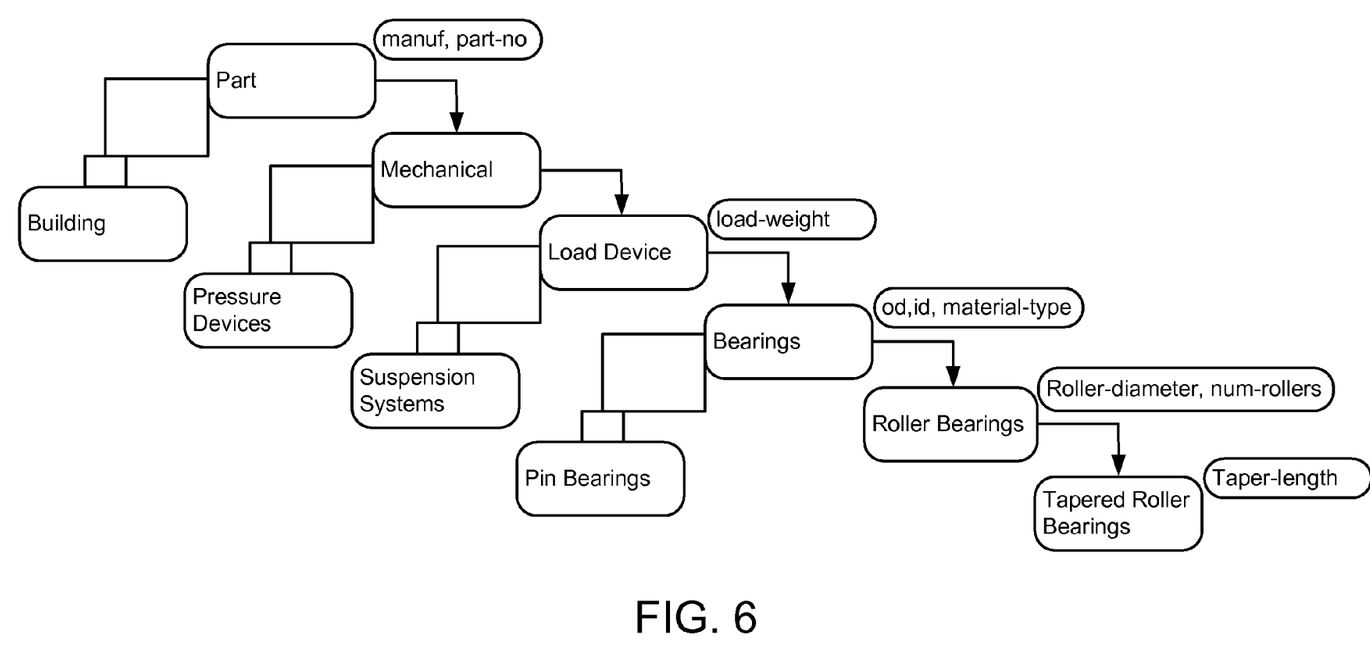
FIG. 6 is a simplified view of a section of a canonical taxonomy in accordance with one or more embodiments of the invention.

FIG. 6 is a simplified (not showing synonym or type and value information) view of a section of the canonical taxonomy 310 down to a tapered roller bearing in accordance with one or more embodiments of the invention. As illustrated, each part within the taxonomy 310 may be a building part or mechanical part, each mechanical part may be a pressure device or a load device (with a load-weight attribute), each load device may be a suspension system or bearings (with an od, id, and material-type attribute), each bearing may be a pin bearing or a roller bearing (with a roller-diameter and num-rollers attribute), and each roller bearing may be a tapered roller bearing (with a taper-length attribute).

As described above, classification systems (whether canonical 310 or mapped 402) can fall into two extreme categories: (1) those that choose to keep a very shallow hierarchy with very general item classes; or (2) those that go extremely deep with highly specific item instances. The key difference between some of these is that at some point further (deeper) classifications are actually based on what may arguably be the attribution of a higher level item. For example, the hierarchy of FIG. 6 could be extended to support "Steel Tapered Roller Bearings", but is this not just a Tapered Roller Bearing with a material-type of "Steel".

With the description of the taxonomy architecture and definitions, a description of the pipeline architecture, i.e., the processing of data into a taxonomy and the searching of such data, is useful to better understand the invention.

Pipeline Architecture

Figure 7:
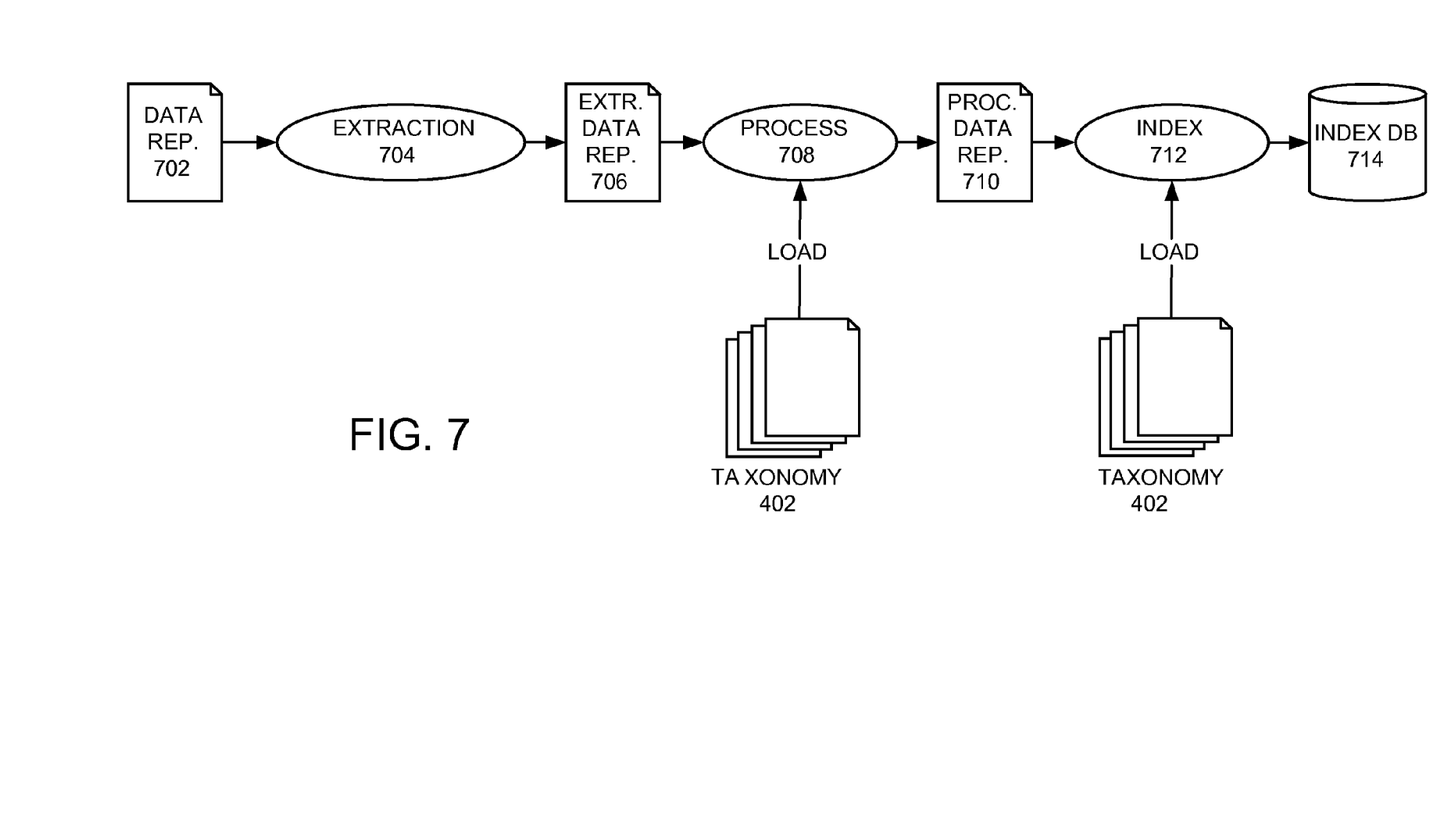
FIG. 7 illustrates how a data representation progresses through the pipeline in accordance with one or more embodiments of the invention.

The pipeline is the system used for extracting and processing the data from content providers (e.g., clients 104). This data may come in many different forms. However, ultimately, it may be turned into an XML representation referred to herein as "Part Atom." FIG. 7 illustrates how a data representation (e.g., Part Atom) progresses through the pipeline in accordance with one or more embodiments of the invention. Accordingly, before entering the processing pipeline of FIG. 7, the various mapped taxonomies 402 are defined and mapped to a canonical taxonomy 310. Once the taxonomy itself is defined, FIG. 7 describes the pipeline for processing the data based on a mapped taxonomy 402. In other words, the pipeline describes the ingestion process for data.

During the first phase, extraction 704, the data representation 702 (e.g., Part Atom) is parsed and links referring to external documents are downloaded for extraction. The extraction process 704 may convert the document/data representation 702 into a text format for searching, extract relevant attributes from drawing data, or it may extract it into other formats to be consumed by the user interface. The result of the extraction process 704 is an extracted data representation 706 (e.g., an extracted Part Atom). In other words, external documents and data are added to the data representation 702 to create the extracted data representation 706.

The next phase of the pipeline, processing 708, attempts to classify the extracted data representation 706 as accurately as possible. To accomplish this, a set of rules is applied based on the origin of the extracted data representation 706, the defined mapping taxonomy 402, the values for the category or part-no fields, and the properties specified.

Accordingly, process 708 parses the output from the first phase (i.e., the extracted data representation 706) and normalizes the data based on the mapped taxonomy 402 (which is loaded into the processing function/module). Each entry within the data extracted representation 706 must contain at least one category in order to be mapped to the canonical taxonomy 310. Referring to FIGS. 4 and 5, for each of the mapping categories 404 identified, the canonical category 406 is retrieved from the canonical taxonomy 310. Additionally, if there are any defined attributes 502 for the mapping category 404, these are inserted into the data representation 706 as additional attributes. After the entry has been processed it will contain one canonical category 406 and a set of normalized attributes 504. In the case of multiple mapped categories 406, the best category may be selected based on how well defined the category is. Thus, once processed 708, the output is a processed data representation 710 (e.g., a processed Part Atom) that is based on the canonical taxonomy 310.

At this point, the data 710 is ready for the next phase, indexing 712. The indexing component 712 reads the output 710 from the processing phase 708. For each entry a document is created in an index/index database 714, including the title, description, canonical category 406, canonical parent category and its attributes 504. For each normalized attribute 504, a new field is added to the index 714 with its corresponding value. At this point, the indexer 712 also checks to see what hyponyms can be added to the attribute keywords (i.e., based on the mapping taxonomy 402 that is loaded into the indexing process/module 712).

Once all of the entries have been indexed, the index/index database 714 is ready to be used by a search-engine.

Search and Result Navigation

In one or more embodiments of the invention, users 104 are provided with the ability to search a processed taxonomy via a website or browser 108. Such a website 108 may consist of two components that provide the ability for users 104 to search for content. The component that is visible to the user 104 is the actual website serving the user interface via a browser 108 (e.g., via web server 110). This website 108 provides on its home page a taxonomy navigation tool and a search box.

Figure 8:
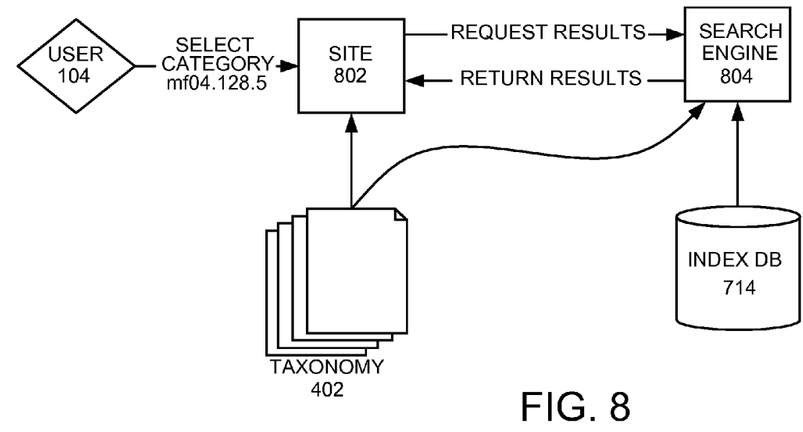
FIG. 8 depicts a system where a user navigates using the taxonomy in accordance with one or more embodiments of the invention.

FIG. 8 depicts a system where a user navigates using the taxonomy in accordance with one or more embodiments of the invention. In FIG. 8, the user 104 chooses a category from the MasterFormat 2004™ taxonomy. This is identified by the system with a unique id (e.g., mf04.128.5). The site component 802 sends the request to the search-engine component 804 to get the results of the query. The search-engine 804 then performs a lookup in the taxonomy 402 for the category id in the request. The taxonomy 402 returns the mapped category with a reference to the canonical category. This canonical category, along with any defined attributes, is then used in the query request to index 714 (e.g., a Lucene™ index). Any results with a matching canonical category will be returned in the result set to the site component 802.

Figure 9:
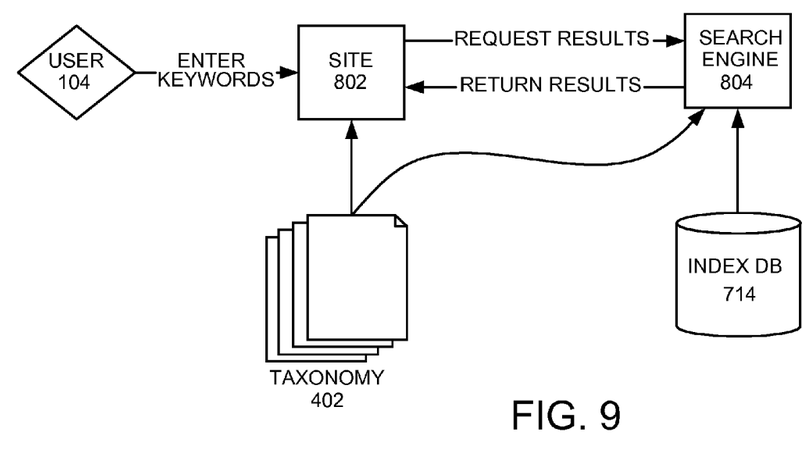
FIG. 9 illustrates a system where a user enters a keyword search without selecting a category in accordance with one or more embodiments of the invention.

In addition, to searching from a standard taxonomy, the user may choose to enter a keyword search without selecting a category. FIG. 9 illustrates a system where a user enters a keyword search without selecting a category in accordance with one or more embodiments of the invention. As illustrated the users' keyword query search is sent to the search-engine 804. Since the search-engine 804 does not have a category to search, it selects a "most-likely" category. Various methods may be used to select such a category. In or more embodiments, the category selected is based on a histogram of the result set (i.e., from prior searches). The search engine 804 then uses this category to execute a search for the user 104, without the user 104 having to navigate the taxonomy 402.

Logical Flow

Figure 10:
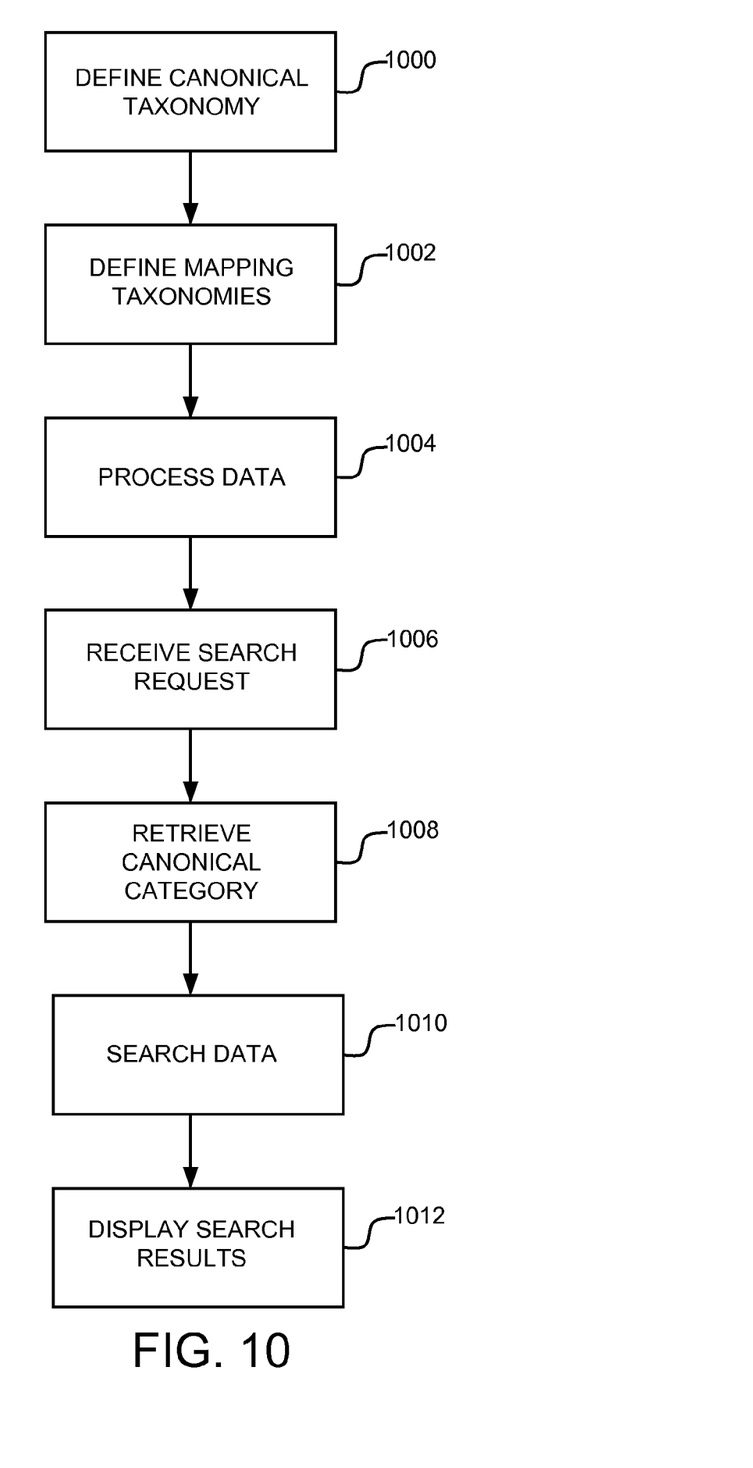
FIG. 10 illustrates the logical flow for establishing, processing, and searching (i.e., locating and displaying data in) multiple taxonomies in accordance with one or more embodiments of the invention.

FIG. 10 illustrates the logical flow for establishing, processing, and searching (i.e., locating and displaying data in) multiple taxonomies in accordance with one or more embodiments of the invention.

At step 1000, a canonical taxonomy is defined. As described above, the canonical taxonomy defines a standard schema and standard data format by which one or more parts are categorized. Further, the canonical taxonomy is not exposed to a user searching the one or more parts. To define the taxonomy, embodiments define canonical categories and canonical attributes for the canonical categories in a canonical hierarchical structure for the parts. The canonical taxonomy may also define enumeration's (establishing a set of valid values for the canonical attributes) and/or variations (establishing equivalencies between values for the canonical attributes).

At step 1002, two or more mapping taxonomies are defined that each define a mapping hierarchical structure for parts. Each mapping taxonomy is defined by defined mapping categories for the parts and defining a category mapping that maps the mapping categories to the canonical categories. Further, additional mapping categories are also defined and a category-attribute mapping is defined from such additional mapping categories to the canonical categories plus a mapping to one or more canonical attributes. Both the canonical taxonomy and mapping taxonomies may be defined using a Web Ontology Language™ (OWL).

It may be noted that when mapping the mapping taxonomy to the canonical taxonomy, the user can simply provide or state that a category is similar to or has the same relationship as a category in a different taxonomy. Thus, the user can specify how a particular taxonomy (or schema for a taxonomy) relates to a different mapping taxonomy that has already been mapped to the canonical taxonomy. Embodiments of the invention would then be able to process all of the data automatically without actually specifying how the new taxonomy maps to the canonical taxonomy (instead a relationship between the new taxonomy and the mapping taxonomy is established).

Once the mapping has been established at step 1002, any amount of data that complies with a particular data format or schema for a mapping taxonomy can then easily be processed at step 1004 (automatically and without additional user input).

At step 1004, the data (i.e., part data) is processed based on the mapping taxonomies. During the processing, each part in the data is mapped to a canonical category. In this regard, the processing step 1004 may first extract the data by parsing the data, downloading documents referred to by links in the data, and extracting mapping attributes and mapping categories from the data.

The output from the extracted data may then be parsed and for each of the mapping categories extracted, a corresponding canonical category is retrieved (e.g., based on how well defined the mapping category is) and inserted into the data.

Further, if there are any canonical attributes for the mapping category, the canonical attribute is also inserted into the data. The data with the inserted canonical attributes may then be indexed wherein for each part in the data, a document is created in an index that contains a title, a description, a canonical category, a canonical parent category in the canonical hierarchical structure, and corresponding canonical attributes. For each corresponding canonical attribute, a field may be added to the index with a corresponding value.

At step 1006, a search request to search the data is received in one of the mapping taxonomies (i.e., the search request is specified and defined in the format of one of the mapping taxonomies).

At step 1008, a canonical category is retrieved from the mapping taxonomy based on the search request. Such a retrieval may be conducted by performing a lookup in the mapping taxonomy for an ID of the category in the request. The mapping taxonomy would then return the mapped category with a reference to the canonical category. The returned canonical category along with any defined attributes are then used in the search step 1010.

At step 1010, the processed data is searched based on the retrieved canonical category. For example, the processed data (i.e., in the index described above) may be searched and results along with the matching canonical category is returned in the result set. Thus, the search results include data from at least two different mapping taxonomies. Accordingly, while the search is specified in the format for a particular mapping taxonomy, the results contain elements from multiple different taxonomies.

At step 1012, the search results are displayed on a display device (e.g., by the user in a browser).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide for a taxonomy and architecture that allows a flexible definition of a part's category from a content provider's standpoint, as well as providing the user the ability to search in a very flexible way.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for locating and displaying data in a taxonomy, comprising:
 (a) defining a canonical taxonomy, wherein:
  (i) the canonical taxonomy defines a standard schema and standard data format by which one or more first parts are categorized;
  (ii) the canonical taxonomy is not exposed to a user searching the one or more first parts; and
  (iii) wherein the canonical taxonomy is defined by:
   (1) defining one or more canonical categories in a canonical hierarchical structure for the one or more first parts; and
   (2) defining, in the canonical hierarchical structure, one or more canonical attributes for one or more of the canonical categories;
 (b) defining two or more mapping taxonomies that each defines a mapping hierarchical structure for one or more second parts, wherein the mapping taxonomies are each defined by:
  (i) defining one or more first mapping categories for one or more of the second parts;
  (ii) defining a category mapping that maps the one or more first mapping categories to one or more canonical categories;
  (iii) defining one or more second mapping categories for one or more of the second parts;
  (iv) defining a category-attribute mapping from the one or more second mapping categories to one or more of the canonical categories plus one or more of the canonical attributes;
 (c) processing the data based on the one or more mapping taxonomies wherein each part in the data is mapped to a canonical category;
 (d) receiving a search request to search the data, wherein the search request is specified in one of the mapping taxonomies;
 (e) retrieving a canonical category from the mapping taxonomy based on the search request;
 (f) searching the processed data based on the retrieved canonical category, wherein the search results includes data from at least two different mapping taxonomies; and
 (g) displaying, on a display device, the search results.

2. The method of claim 1, wherein the canonical taxonomy defines an enumeration comprising a set of valid values for one or more of the canonical attributes.

3. The method of claim 1, wherein the canonical taxonomy defines a variation that establishes equivalencies between values for one or more of the canonical attributes.

4. The method of claim 1, wherein the canonical taxonomy and one or more mapping taxonomies are defined using a Web Ontology Language™ (OWL).

5. The method of claim 1, wherein the processing data further comprises extracting the data, wherein the extracting comprises:
 parsing the data;
 downloading documents referred to by links in the data; and
 extracting one or more mapping attributes and one or more mapping categories from the data.

6. The method of claim 5, wherein the processing further comprises:
 (a) parsing output from the extracting;
 (b) for each of the mapping categories extracted:
  (i) retrieving a corresponding canonical category;
  (ii) inserting the canonical category into the data; and
  (iii) if there are any canonical attributes for the mapping category, inserting the canonical attributes into the data.

7. The method of claim 6, wherein the retrieving of the corresponding canonical category comprises selecting a canonical category based on how well defined the mapping category is.

8. The method of claim 6, wherein the processing data further comprises indexing the data wherein:
- for each part in the data, a document is created in an index, wherein the document comprises a title, a description, a canonical category, a canonical parent category in the canonical hierarchical structure, and one or more corresponding canonical attributes; and
- for each canonical attribute, a field is added to the index with a corresponding value.

9. An apparatus for locating and displaying data in a taxonomy in a computer system comprising:
- (a) a computer system having a memory and a data storage device coupled thereto;
- (b) one or more computer programs, performed by the computer, wherein the computer programs are configured to:
   - (i) define a canonical taxonomy, wherein:
      - (1) the canonical taxonomy defines a standard schema and standard data format by which one or more first parts are categorized;
      - (2) the canonical taxonomy is not exposed to a user searching the one or more first parts; and
      - (3) wherein the canonical taxonomy is defined by:
         - (A) defining one or more canonical categories in a canonical hierarchical structure for the one or more first parts; and
         - (B) defining, in the canonical hierarchical structure, one or more canonical attributes for one or more of the canonical categories;
   - (ii) define two or more mapping taxonomies that each defines a mapping hierarchical structure for one or more second parts, wherein the mapping taxonomies are each defined by:
      - (1) defining one or more first mapping categories for one or more of the second parts;
      - (2) defining a category mapping that maps the one or more first mapping categories to one or more canonical categories;
      - (3) defining one or more second mapping categories for one or more of the second parts;
      - (4) defining a category-attribute mapping from the one or more second mapping categories to one or more of the canonical categories plus one or more of the canonical attributes;
   - (iii) process the data based on the one or more mapping taxonomies wherein each part in the data is mapped to a canonical category;
   - (iv) receive a search request to search the data, wherein the search request is specified in one of the mapping taxonomies;
   - (v) retrieve a canonical category from the mapping taxonomy based on the search request;
   - (vi) search the processed data based on the retrieved canonical category, wherein the search results includes data from at least two different mapping taxonomies; and
   - (vii) display, on a display device, the search results.

10. The apparatus of claim 9, wherein the canonical taxonomy defines an enumeration comprising a set of valid values for one or more of the canonical attributes.

11. The apparatus of claim 9, wherein the canonical taxonomy defines a variation that establishes equivalencies between values for one or more of the canonical attributes.

12. The apparatus of claim 9, wherein the canonical taxonomy and one or more mapping taxonomies are defined using a Web Ontology Language™ (OWL).

13. The apparatus of claim 9, wherein the computer program is configured to process by extracting the data, wherein the extracting comprises:
- parsing the data;
- downloading documents referred to by links in the data; and
- extracting one or more mapping attributes and one or more mapping categories from the data.

14. The apparatus of claim 13, wherein the computer program is further configured to process by:
- (a) parsing output from the extracting;
- (b) for each of the mapping categories extracted:
   - (i) retrieving a corresponding canonical category;
   - (ii) inserting the canonical category into the data; and
   - (iii) if there are any canonical attributes for the mapping category, inserting the canonical attributes into the data.

15. The apparatus of claim 14, wherein the retrieving of the corresponding canonical category comprises selecting a canonical category based on how well defined the mapping category is.

16. The apparatus of claim 14, wherein the computer program is configured to further process by indexing the data wherein:
- for each part in the data, a document is created in an index, wherein the document comprises a title, a description, a canonical category, a canonical parent category in the canonical hierarchical structure, and one or more corresponding canonical attributes; and
- for each canonical attribute, a field is added to the index with a corresponding value.

17. A non-transitory program storage device, readable by a computer, tangibly embodying at least one program of instructions executable by the computer to perform the method steps for locating and displaying data in a taxonomy in a computer system, the method steps comprising the steps of:
- (a) defining a canonical taxonomy, wherein:
   - (i) the canonical taxonomy defines a standard schema and standard data format by which one or more first parts are categorized;
   - (ii) the canonical taxonomy is not exposed to a user searching the one or more first parts; and
   - (iii) wherein the canonical taxonomy is defined by:
      - (1) defining one or more canonical categories in a canonical hierarchical structure for the one or more first parts; and
      - (2) defining, in the canonical hierarchical structure, one or more canonical attributes for one or more of the canonical categories;
- (b) defining two or more mapping taxonomies that each defines a mapping hierarchical structure for one or more second parts, wherein the mapping taxonomies are each defined by:
   - (i) defining one or more first mapping categories for one or more of the second parts;
   - (ii) defining a category mapping that maps the one or more first mapping categories to one or more canonical categories;
   - (iii) defining one or more second mapping categories for one or more of the second parts;
   - (iv) defining a category-attribute mapping from the one or more second mapping categories to one or more of the canonical categories plus one or more of the canonical attributes;

(c) processing the data based on the one or more mapping taxonomies wherein each part in the data is mapped to a canonical category;
(d) receiving a search request to search the data, wherein the search request is specified in one of the mapping taxonomies;
(e) retrieving a canonical category from the mapping taxonomy based on the search request;
(f) searching the processed data based on the retrieved canonical category, wherein the search results includes data from at least two different mapping taxonomies; and
(g) displaying, on a display device, the search results.

18. The program storage device of claim 17, wherein the canonical taxonomy defines an enumeration comprising a set of valid values for one or more of the canonical attributes.

19. The program storage device of claim 17, wherein the canonical taxonomy defines a variation that establishes equivalencies between values for one or more of the canonical attributes.

20. The program storage device of claim 17, wherein the canonical taxonomy and one or more mapping taxonomies are defined using a Web Ontology Language™ (OWL).

21. The program storage device of claim 17, wherein the method steps for processing data further comprise method steps for extracting the data, wherein the extracting comprises:
 parsing the data;
 downloading documents referred to by links in the data; and
 extracting one or more mapping attributes and one or more mapping categories from the data.

22. The program storage device of claim 21, wherein the method steps for processing further comprises method steps for:
(a) parsing output from the extracting;
(b) for each of the mapping categories extracted:
 (i) retrieving a corresponding canonical category;
 (ii) inserting the canonical category into the data; and
 (iii) if there are any canonical attributes for the mapping category, inserting the canonical attributes into the data.

23. The program storage device of claim 22, wherein the method steps for retrieving of the corresponding canonical category comprises selecting a canonical category based on how well defined the mapping category is.

24. The program storage device of claim 22, wherein the method steps for processing data further comprises indexing the data wherein:
 for each part in the data, a document is created in an index, wherein the document comprises a title, a description, a canonical category, a canonical parent category in the canonical hierarchical structure, and one or more corresponding canonical attributes; and
 for each canonical attribute, a field is added to the index with a corresponding value.

* * * * *